US012332591B2

(12) United States Patent
Miyashita

(10) Patent No.: US 12,332,591 B2
(45) Date of Patent: *Jun. 17, 2025

(54) FIXING DEVICE

(71) Applicant: TOSHIBA TEC KABUSHIKI KAISHA, Tokyo (JP)

(72) Inventor: Kousei Miyashita, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,885

(22) Filed: Sep. 21, 2023

(65) Prior Publication Data

US 2024/0012352 A1 Jan. 11, 2024

Related U.S. Application Data

(63) Continuation of application No. 17/700,132, filed on Mar. 21, 2022, now Pat. No. 11,796,941.

(51) Int. Cl.
*G03G 15/20* (2006.01)

(52) U.S. Cl.
CPC ................................ *G03G 15/2053* (2013.01)

(58) Field of Classification Search
CPC ....... G03G 15/2053; G03G 2215/2035; G03G 15/2064; G03G 15/2039; G03G 15/2042
See application file for complete search history.

(56) References Cited

U.S. PATENT DOCUMENTS

| | | | |
|---|---|---|---|
| 5,813,500 | A | 9/1998 | Deferme |
| 6,371,262 | B1 | 4/2002 | Katou et al. |
| 8,800,729 | B2 | 8/2014 | Yabe et al. |
| 9,121,524 | B2 | 9/2015 | Ashiba |

(Continued)

FOREIGN PATENT DOCUMENTS

| | | |
|---|---|---|
| JP | 2005-070278 A | 3/2005 |
| JP | 2017-142427 A | 8/2017 |

(Continued)

OTHER PUBLICATIONS

Non-Final Office Action on U.S. Appl. No. 17/700,132 Dtd Feb. 2, 2023.

(Continued)

*Primary Examiner* — Jessica L Eley
(74) *Attorney, Agent, or Firm* — FOLEY & LARDNER LLP

(57) ABSTRACT

A device configured to fix toner to a sheet including a tubular body, a heater, and a heat conduction section. The tubular body is configured to be in contact with a sheet moving in a first direction. The heater includes a heat generator. The heater includes a first surface and a second surface on the opposite side of the first surface. The first surface of the heater is in contact with the inner surface of the tubular body. The heat conduction section is in contact with the second surface of the heater. The heat conduction section includes a first heat transfer section and a second heat transfer section. The first heat transfer section is in contact with the second surface of the heater. The second heat transfer section is in contact with the surface opposite to the heater with respect to the first heat transfer section.

20 Claims, 8 Drawing Sheets

(56) References Cited

U.S. PATENT DOCUMENTS

| | | | |
|---|---|---|---|
| 9,150,077 B2 | 10/2015 | Roessle et al. | |
| 9,217,971 B1 | 12/2015 | Matsumoto et al. | |
| 9,342,044 B2 * | 5/2016 | Naitoh | G03G 21/1685 |
| 9,353,818 B2 | 5/2016 | Marking | |
| 9,507,303 B2 * | 11/2016 | Imaizumi | G03G 15/206 |
| 9,523,951 B2 * | 12/2016 | Suzuki | G03G 15/2042 |
| 10,935,912 B1 | 3/2021 | Yokoyama | |
| 11,009,819 B2 * | 5/2021 | Endo | G03G 15/2053 |
| 2006/0225976 A1 | 10/2006 | Nakadate | |
| 2011/0209956 A1 | 9/2011 | Maeda | |
| 2013/0017003 A1 * | 1/2013 | Mukai | G03G 15/2053 399/329 |
| 2014/0150897 A1 | 6/2014 | Ashiba | |
| 2014/0262655 A1 | 9/2014 | Tuts et al. | |
| 2015/0337918 A1 | 11/2015 | Rummel | |
| 2016/0011548 A1 | 1/2016 | Utsunomiya et al. | |
| 2016/0146286 A1 | 5/2016 | Rummel et al. | |
| 2017/0321778 A1 | 11/2017 | Knezevic et al. | |
| 2019/0285130 A1 | 9/2019 | Rasseler et al. | |
| 2019/0286026 A1 | 9/2019 | Furuichi et al. | |
| 2021/0294251 A1 | 9/2021 | Endo | |

FOREIGN PATENT DOCUMENTS

| | | |
|---|---|---|
| JP | 2020-038321 A | 3/2020 |
| JP | 2020-106665 A | 7/2020 |

OTHER PUBLICATIONS

Notice of Allowance on U.S. Appl. No. 17/700,132 Dtd Jun. 22, 2023.

* cited by examiner

FIXING DEVICE

CROSS-REFERENCE TO RELATED APPLICATION

This application is a continuation of U.S. application Ser. No. 17/700,132, filed on Mar. 21, 2022, the entire disclosure of which is hereby incorporated by reference herein.

FIELD

Embodiments described herein relate generally to a fixing device.

BACKGROUND

An image forming apparatus forms an image on a sheet. The image forming apparatus includes a fixing device (a device configured to fix toner to a sheet of paper) by heating toner (a recording agent) and fixing the toner on the sheet. Temperature unevenness of the fixing device sometimes causes unevenness of gloss in the image formed on the sheet.

DETAILED DESCRIPTION

Figure 1:
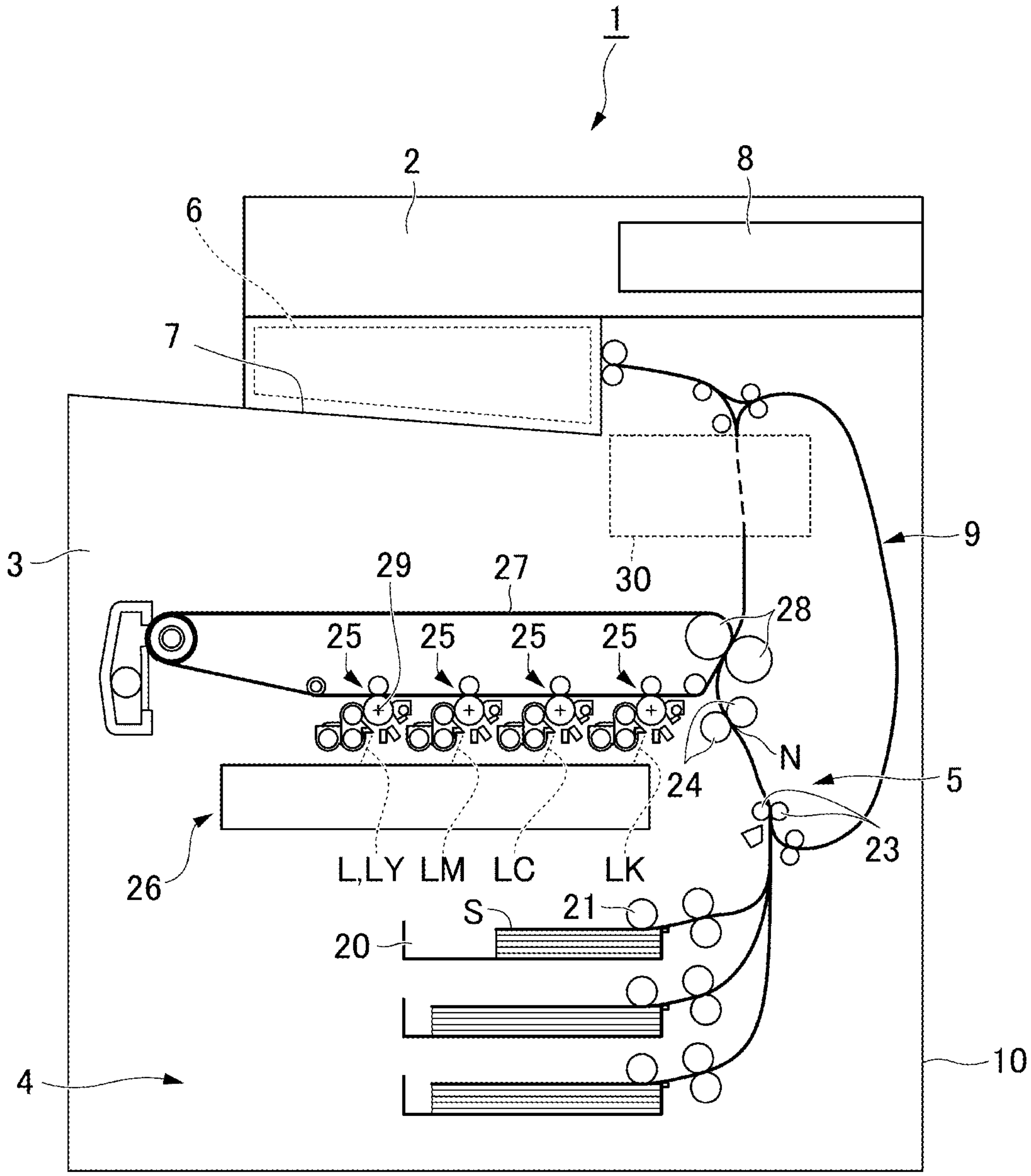
FIG. 1 is a schematic configuration diagram of an image forming apparatus according to some embodiments.

In general, according to one embodiment, a device configured to fix toner to a sheet of paper includes a tubular body, a heater unit, and a heat conduction section. The tubular body is configured to be in contact with a sheet moving in a first direction. The tubular body rotates around an axis extending along a second direction orthogonal to the first direction. The heater includes a heat generator. The heater includes a first surface and a second surface on the opposite side of the first surface. The first surface of the heater is in contact with the inner surface of the tubular body. The heat conduction section is in contact with the second surface of the heater and transfers heat generated from the heat generator. The heat conduction section includes a first heat transfer section and a second heat transfer section. The first heat transfer section is in contact with the second surface of the heater. The second heat transfer section is provided in contact with the surface opposite to the heater with respect to the first heat transfer section. The second heat transfer section has a lower thermal conductivity and a larger heat capacity per unit length in the second direction compared to the first heat transfer section.

The device in the embodiment is explained below with reference to the drawings. In the following explanation, components having the same or similar functions are denoted by the same reference numerals and signs. Explanation of the components is sometimes omitted.

FIG. 1 is a schematic configuration diagram of an image forming apparatus according to some embodiments.

As illustrated in FIG. 1, an image forming apparatus 1 performs processing for forming an image on a sheet S. The sheet S may be paper. The image forming apparatus 1 includes a housing 10, a scanner section (scanner) 2, an image forming unit (image former) 3, a sheet feeding section (sheet feeder) 4, a conveying section (conveyor) 5, a paper discharge tray 7, a reversing unit (reverser) 9, a control panel 8, and a control section (controller) 6.

The housing 10 forms the exterior of the image forming apparatus 1.

The scanner section 2 reads image information of a copying target object based on brightness and darkness of light and generates an image signal. The scanner section 2 outputs the generated image signal to the image forming unit 3.

The image forming unit 3 forms one or more toner images with recording agents such as toners based on the image signal received from the scanner section 2 and/or an image signal received from an external device (e.g., a computing device, a server). The image forming unit 3 transfers the toner images onto the surface of the sheet S. The image forming unit 3 heats and pressurizes the toner images on the surface of the sheet S, fixing the toner images on the sheet S.

The sheet feeding section 4 feeds sheets S to the conveying section 5 one by one according to a timing schedule based on the image forming unit 3 completely or partially forming the toner images. In alternate embodiments, the sheet feeding section 4 feeds multiple sheets S to the conveying section. The sheet feeding section 4 includes a sheet storing section (sheet storage) 20 and a pickup roller 21.

The sheet storing section 20 stores the sheets S.

The pickup roller 21 picks up (e.g., transfers) the sheets S from the sheet storing section 20 one by one. In alternate embodiments, the pickup roller 21 picks up multiple sheets S from the sheet storing section 20. The pickup roller 21 feeds the picked-up sheet S to the conveying section 5.

The conveying section 5 conveys the sheet S fed from the sheet feeding section 4 to the image forming unit 3. The conveying section 5 includes a conveying roller 23 and a registration roller 24.

The conveying roller 23 conveys the sheet S fed from the pickup roller 21 to the registration roller 24. The conveying roller 23 butts the leading end in a conveying direction of the sheet S against a nip N of the registration roller 24.

The registration roller 24 bends the sheet S in the nip N to thereby adjust the position of the leading end of the sheet S in the conveying direction. The registration roller 24 conveys the sheet S according to the timing schedule (e.g., when the image forming unit 3 transfers the toner images onto the sheet S).

The image forming unit 3 includes a plurality of image forming sections (image formers) 25, a laser scanning unit (laser scanner) 26, an intermediate transfer belt 27, a transfer section (transferor) 28, and a fixing device (a device configured to fix toner to a sheet of paper) 30.

The image forming sections 25 include photoconductive drums 29. The image forming sections 25 form toner images corresponding to an image signal from the scanner section 2 and/or an external device on the photoconductive drums 29. The plurality of image forming sections 25 respectively form toner images using yellow, magenta, cyan, and black toners.

Charging devices (chargers), developing devices (developers), and the like are provided around the photoconductive drums 29. The charging devices charge the surfaces of the photoconductive drums 29. The developing devices store developers including the yellow, magenta, cyan, and black toners. The developing devices develop electrostatic latent images on the photoconductive drums 29. The toner images by the color toners are formed on the photoconductive drums 29.

The laser scanning unit 26 scans the charged photoconductive drums 29 with laser lights L and exposes the photoconductive drums 29. The laser scanning unit 26 exposes the photoconductive drums 29 of the image forming sections 25 with colors using respective laser lights LY (corresponding to yellow toners), LM (corresponding to magenta toners), LC (corresponding to cyan toners), and LK (corresponding to black toners). The laser scanning unit 26 forms electrostatic latent images on the photoconductive drums 29.

The toner images on the surfaces of the photoconductive drums 29 are primarily (or partially) transferred onto the intermediate transfer belt 27.

The transfer section 28 transfers the toner images primarily transferred on the intermediate transfer belt 27 onto the surface of the sheet S in a secondary transfer position.

The fixing device 30 heats and pressurizes the toner images transferred on the sheet S and fixes the toner images on the sheet S.

The reversing unit 9 reverses the sheet S in order to form an image on the rear surface of the sheet S. The reversing unit 9 reverses, with a switchback, the sheet S discharged from the fixing device 30. The reversing unit 9 conveys the reversed sheet S toward the registration roller 24.

The sheet S having the image formed thereon and discharged is placed on the paper discharge tray 7.

The control panel 8 is a part of an input section (input panel and/or interface) which an operator inputs information for operating the image forming apparatus 1. The control panel 8 includes a touch panel and various hard keys.

The control section 6 performs control of the sections (e.g., scanner section 2, the image forming unit 3, the sheet feeding section 4, the conveying section 5, the reversing unit 9, the control panel 8) of the image forming apparatus 1.

Figure 2:
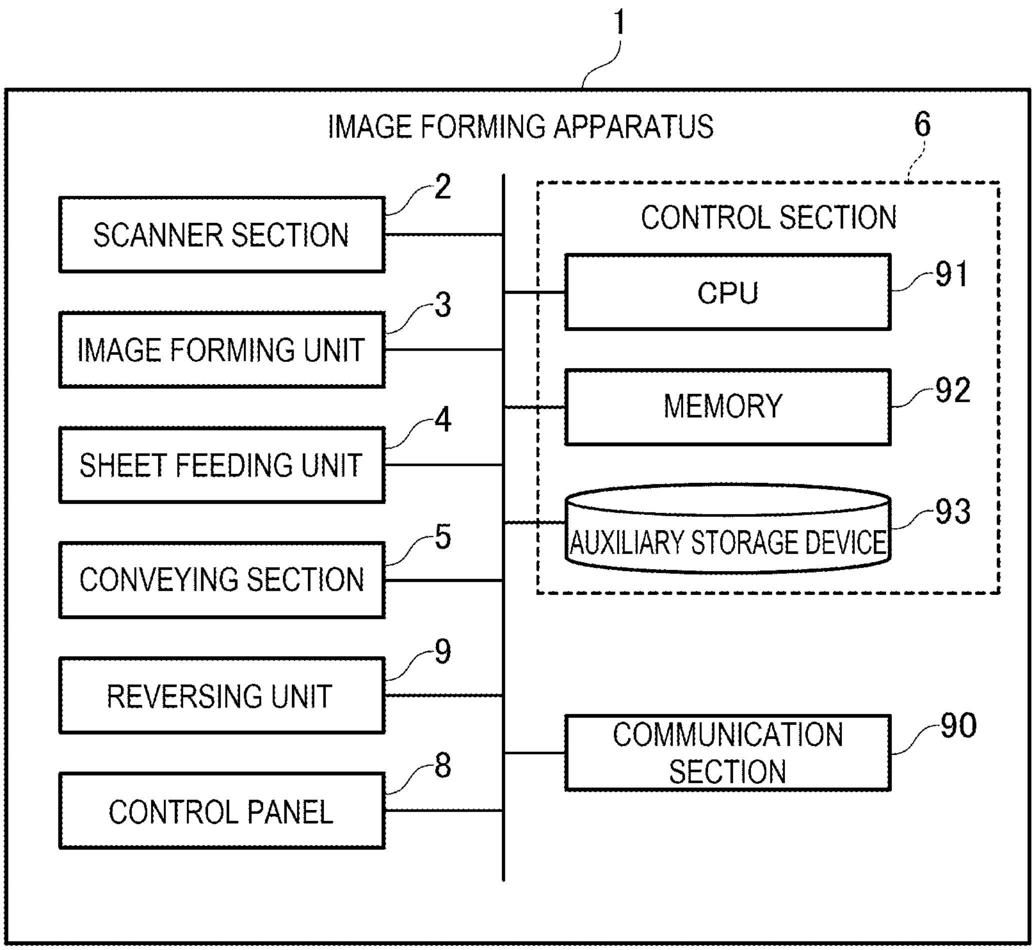
FIG. 2 is a hardware configuration diagram of a image forming apparatus according to some embodiments.

FIG. 2 is a hardware configuration diagram of the image forming apparatus according to some embodiments.

As illustrated in FIG. 2, the image forming apparatus 1 includes a CPU (Central Processing Unit) 91, a memory 92, and an auxiliary storage device 93 connected by a bus. The image forming apparatus 1 executes a program. The image forming apparatus 1 executes the program to execute the scanner section 2, the image forming unit 3, the sheet feeding section 4, the conveying section 5, the reversing unit 9, the control panel 8, and a communication section 90.

The CPU 91 executes a program stored in the memory 92 and the auxiliary storage device 93 to thereby cause the control section 6 to function. The control section 6 controls the operations of the functional sections (e.g., scanner section 2, the image forming unit 3, the sheet feeding section 4, the conveying section 5, the reversing unit 9, the control panel 8, and the communication section 90) of the image forming apparatus 1.

The auxiliary storage device 93 includes a storage device such as a magnetic hard disk device and/or a semiconductor storage device. The auxiliary storage device 93 stores information such as timing schedule(s), temperature threshold(s), and the like.

The communication section 90 includes a communication interface for connecting the image forming apparatus 1 to one or more external devices. The communication section 90 communicates with the external device via the communication interface.

Figure 3:
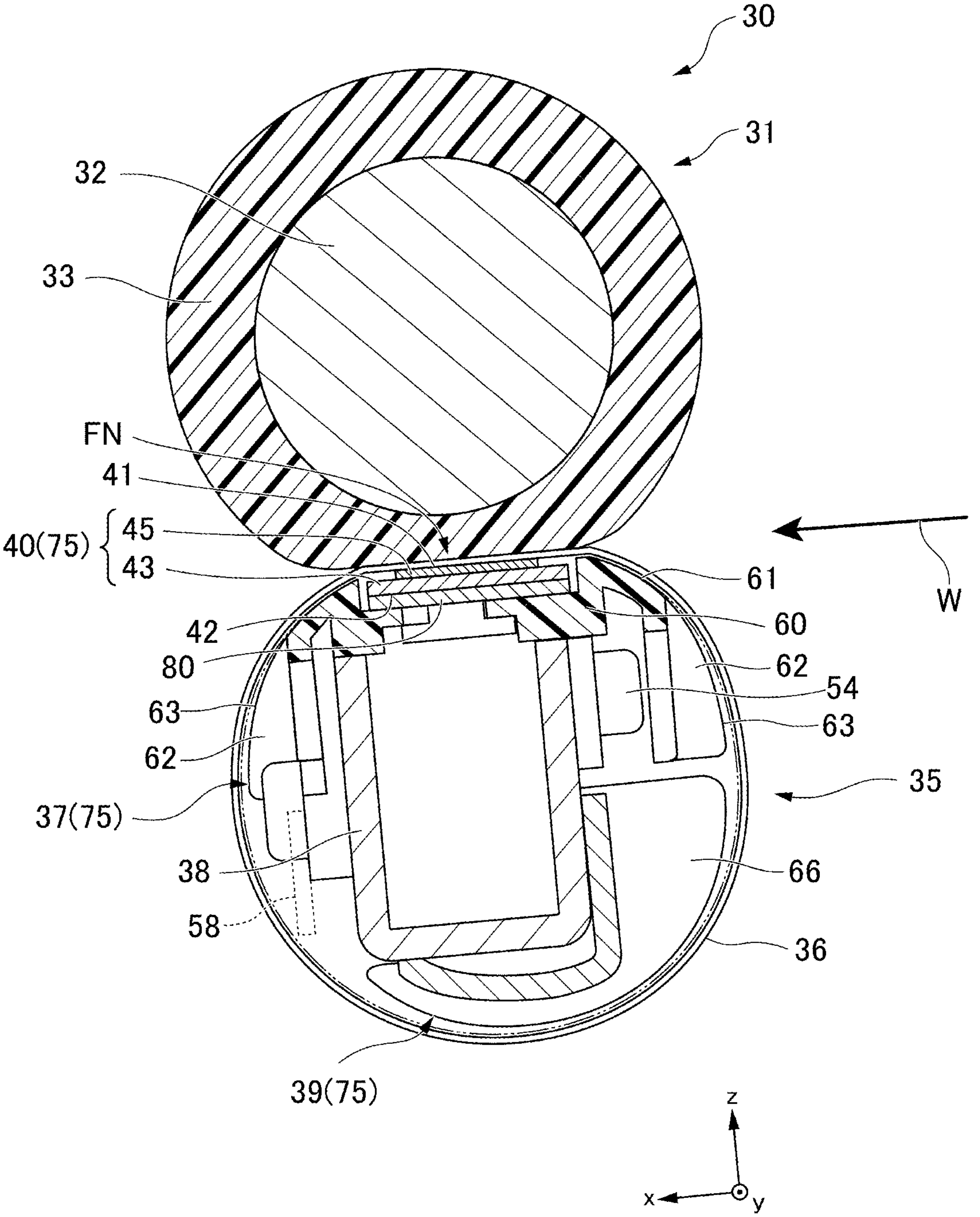
FIG. 3 is a front sectional view of a fixing device according to some embodiments.
Figure 4:
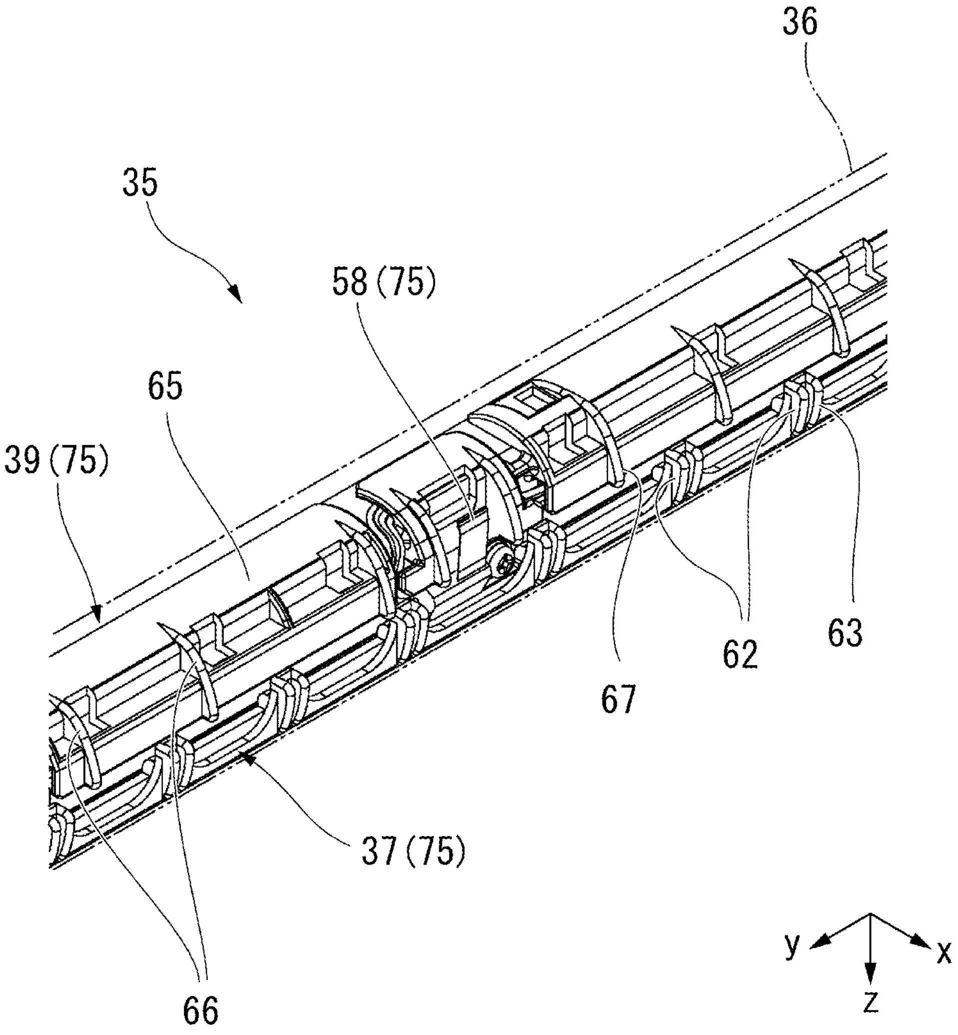
FIG. 4 is a perspective view of a film unit according to some embodiments.

FIG. 3 is a front sectional view of a fixing device according to some embodiments. FIG. 4 is a perspective view of a film unit according to some embodiments.

As illustrated in FIG. 3, the fixing device 30 includes a pressurizing roller 31 and a film unit (film dispenser) 35. A fixing nip FN is formed between the pressurizing roller 31 and the film unit 35. The pressurizing roller 31 pressurizes toner images on the sheet S that enters the fixing nip FN. The pressurizing roller 31 rotates to convey the sheet S. The film unit 35 heats the toner images on the sheet S that enters the fixing nip FN.

In this application, a z direction, an x direction, and a y direction are defined as follows. The z direction is a direction in which the pressurizing roller 31 and the film unit 35 are disposed side by side. A +z direction is a direction from the film unit 35 to the pressurizing roller 31. The x direction (a first direction) is a conveying direction of the sheet S in the fixing nip FN. A +x direction is a downstream side of the conveying direction of the sheet S. The y direction (a second direction) is a direction orthogonal to the z direction and the x direction. The y direction is the direction of the rotation axis of a tubular body 36.

The pressurizing roller 31 includes a core bar 32, an elastic layer 33, and a release layer.

The core bar 32 is formed of a metal material such as stainless steel. The core bar 32 has a columnar shape. The core bar 32 is rotatably supported at both end portions in the axial direction of the core bar 32. The core bar 32 is driven to rotate by a motor. The core bar 32 is in contact with a cam member. The cam member rotates to thereby bring the core bar 32 close to (within a threshold distance) and separate the core bar 32 from (within a threshold distance) the film unit 35. The direction of the rotation axis of the pressurizing roller 31 is the y direction.

The elastic layer 33 is formed of an elastic material such as silicone rubber. The elastic layer 33 is formed at fixed thickness on the outer circumferential surface of the core bar 32.

The release layer is formed of a resin material such as PFA (tetrafluoroethylene-perfluoroalkylvinylether copolymer). The release layer is formed on the outer circumferential surface of the elastic layer 33.

The pressurizing roller 31 can approach and separate from the film unit 35 according to rotation of the cam member. If the pressurizing roller 31 is brought close to the film unit 35 (e.g., within a threshold distance), and pressed by a pressurizing spring, the fixing nip FN is formed. If a jam of the sheet S occurs in the fixing device 30, the sheet S can be removed by separating the pressurizing roller 31 from the film unit 35 according to a threshold distance. If the pressurizing roller 31 is separated from the film unit 35 a threshold distance, and the tubular body is not rotating (e.g., the tubular body is in a sleep state and/or is powered off), plastic deformation of the tubular body 36 can be suppressed (or reduced).

The pressurizing roller 31 is driven to rotate by a motor. If the pressurizing roller 31 rotates in a state in which the fixing nip FN is formed, the tubular body 36 of the film unit 35 rotates following the rotation of the pressurizing roller 31. The pressurizing roller 31 conveys the sheet S in a conveying direction W by rotating in a state in which the sheet S is placed in the fixing nip FN.

The film unit 35 includes the tubular body 36, a heater unit (heater) 40, a heat conduction section 80, a supporting member 37, a stay 38, a guide member 39, a thermosensitive element 54, and a plurality of temperature detecting sections (temperature detectors) 58.

The tubular body 36 is a film-like fixing belt. The tubular body 36 has a tubular shape extending in the y direction. The tubular body 36 includes a base layer, an elastic layer, and a release layer in order from the inner circumference side. The base layer is a tubular body formed of a material such as polyimide. The elastic layer is stacked on the outer circumferential surface of the base layer. The elastic layer is formed of an elastic material such as silicone rubber. The release layer is stacked on the outer circumferential surface of the elastic layer. The release layer is formed of a material such as PFA resin.

The heater unit 40 is present on the inner side of the tubular body 36. The heater unit 40 has a rectangular plate shape having the y direction as a longitudinal direction and having the x direction as a latitudinal direction. In some embodiments, a direction (e.g., x direction) approaching the center of the heater unit 40 is referred to as inner side, and a direction (e.g., y direction) separating from the center of the heater unit 40 is referred to as outer side. The heater unit 40 includes a first surface 41 in the +z direction and a second surface 42 facing the opposite side of the first surface 41. The first surface 41 of the heater unit 40 is in contact with the inner surface of the tubular body 36 via grease.

The heater unit 40 includes a substrate and a heat generating section (heating portion).

The substrate is formed of a metal material (e.g., a stainless steel or the like), a ceramic material (e.g., aluminum nitride or the like), or the like. The substrate has a rectangular plate shape having the y direction as a longitudinal direction and having the x direction as a latitudinal direction. An insulating layer is formed of a glass material or the like on the surface in the +z direction of the substrate. The surface in the −z direction of the substrate is the second surface 42 of the heater unit 40. The second surface 42 of the heater unit 40 is formed in a plane shape orthogonal to the z direction. An insulating layer is formed on the surface in the +z direction of the substrate. The surface in the +z direction of the substrate is a surface opposed to the inner surface of the tubular body 36.

The heat generating section is formed on the surface in the +z direction of the insulating layer. The heat generating section is formed on the surface in the +z direction of the substrate via the insulating layer. The heat generating section includes one or a plurality of heat generating bodies.

The heat generating section may be provided on the surface in the −z direction of the substrate. In that case, the insulating layer may not be formed on the surface in the +z direction of the substrate. The surface in the +z direction of the substrate is in contact with the tubular body 36.

The heat conduction section 80 has a rectangular plate shape having the y direction as a longitudinal direction and having the x direction as a latitudinal direction. The heat conduction section 80 has a rectangular plate shape having substantially the same size as the size of the substrate of the heater unit 40 in the x direction and the y direction. The heat conduction section 80 overlaps the heater unit 40. The heat conduction section 80 is in contact with at least a part of the second surface 42 of the heater unit 40. The heat conduction section 80 transfers heat generated from the heat generating section of the heater unit 40 in the y direction. The heat conduction section may also be referred to as "soaking member."

As illustrated in FIGS. 3 and 4, the supporting member 37 is formed of, for example, a resin material such as liquid crystal polymer. The supporting member 37 is present on the opposite side of the heater unit 40 across the heat conduction section 80. The supporting member 37 includes a base 60 and a plurality of sliding contact ribs 62.

The base 60 covers the −z direction and both the sides in the x direction of the heater unit 40 and the heat conduction section 80. The base 60 supports the heater unit 40 via the heat conduction section 80. The base 60 includes guide surfaces 61. The guide surfaces 61 are in sliding contact with the inner circumferential surface of the tubular body 36. The guide surfaces 61 are present at both the end portions in the x direction of the base 60. The guide surfaces 61 are present on both the sides in the x direction with respect to the heater unit 40. The guide surfaces 61 are formed in a curved surface shape along the circumferential direction of the tubular body 36. The guide surfaces 61 are continuous in the y direction.

The sliding contact ribs 62 project to the outer side in the x direction and to the −z direction from the base 60. The sliding contact ribs 62 have thickness in the y direction. The sliding contact ribs 62 are arranged, in each of the +x direction and the −x direction with respect to the base 60, at intervals in the y direction. The sliding contact ribs 62 include end edges 63 that are in sliding contact with the inner circumferential surface of the tubular body 36. The end edges 63 of the sliding contact ribs 62 extend in the circumferential direction of the tubular body 36. The end edges 63 of the sliding contact ribs 62 extend in a direction separating from the heater unit 40 continuously from the guide surfaces 61 of the base 60 when viewed from the y direction.

The stay 38 is formed of a steel plate material or the like. A cross section perpendicular to the y direction of the stay 38 has a U shape. The stay 38 is attached in the −z direction of the supporting member 37 to close a U-shaped opening section with the base 60 of the supporting member 37. A half part in the +z direction of the stay 38 is present between the sliding contact ribs 62 on both the sides in the x direction of the supporting member 37. The stay 38 has length in the y direction. Both the end portions in the y direction of the stay 38 are fixed to the housing 10 of the image forming apparatus 1. Consequently, the film unit 35 is supported by the image forming apparatus 1. Among other functions, the stay 38 increases the bending rigidity of the film unit 35.

The guide member 39 is formed of a resin material or the like. The guide member 39 is present on the opposite side of the heater unit 40 across the supporting member 37. The guide member 39 includes a base 65 and a plurality of guide ribs 66. The base 65 is attached to a half part in the −z direction of the stay 38. The guide ribs 66 project in the +x direction from the base 65. The guide ribs 66 have thickness in the y direction. The plurality of guide ribs 66 are arranged at intervals in the y direction. The guide ribs 66 are present in positions different from the positions of the sliding contact ribs 62 of the supporting member 37 in the y direction. The guide ribs 66 include end edges 67 that are in sliding contact with the inner circumferential surface of the tubular body 36. The end edges 67 of the guide ribs 66 extend in the circumferential direction of the tubular body 36.

The temperature detecting section 58 is in contact with the inner circumferential surface of a part of the tubular body 36. The plurality of temperature detecting sections 58 are arranged at intervals in the y direction (see FIG. 8). The temperature detecting section 58 detects the temperature of the tubular body 36. The plurality of temperature detecting sections 58 detect the temperatures of portions different from one another in the y direction in the tubular body 36.

The control section 6 measures the temperatures of portions in the y direction of the tubular body 36 with the temperature detecting sections 58 at an operation time of the fixing device 30. The control section 6 controls energization (e.g., transmits control signals) to the heat generating section of the heater unit 40 based on temperature measurements of one or more portions of the tubular body 36 in the y direction.

The thermosensitive element 54 is provided in the supporting member 37.

The supporting member 37 and the guide member 39 form contact bodies 75 that are in contact with the tubular body 36.

First Embodiment

Figure 5:
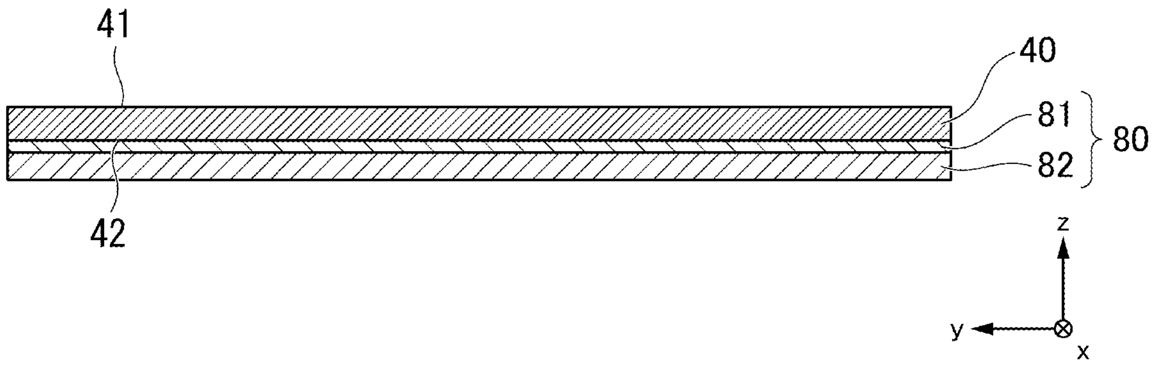
FIG. 5 is a configuration diagram of a heater unit and a heat conduction section in a film unit in a first embodiment.

FIG. 5 is a configuration diagram of the heater unit 40 and the heat conduction section 80 in a film unit according to a first embodiment.

As illustrated in FIG. 5, the heat conduction section 80 includes a first heat transfer section 81 and a second heat transfer section 82.

The first heat transfer section 81 has a rectangular plate shape having the y direction as a longitudinal direction and having the x direction as a latitudinal direction. The first heat transfer section 81 is formed of, for example, a graphite sheet or a metal material. The first heat transfer section 81 overlaps the second surface 42 of the heater unit 40. The first heat transfer section 81 is in contact with at least a part of the second surface 42 of the heater unit 40.

The second heat transfer section 82 has a rectangular plate shape having the y direction as a longitudinal direction and having the x direction as a latitudinal direction. The second heat transfer section 82 is formed of, for example, a metal material such as copper or aluminum. The second heat transfer section 82 overlaps the surface of the first heat transfer section 81 opposite to the heater unit 40. The second heat transfer section 82 is in contact with at least a part of the surface of the first heat transfer section 81 opposite to the heater unit 40. The second heat transfer section 82 has a rectangular plate shape having substantially the same size as the size of the first heat transfer section 81 in the x direction and the y direction. The second heat transfer section 82 may be in contact with the supporting member 37. The surface of the second heat transfer section 82 opposed to the first heat transfer section 81 is flat.

The first heat transfer section 81 and the second heat transfer section 82 have thermal conductivities different from each other. The second heat transfer section 82 has lower thermal conductivity compared to the first heat transfer section 81. A direction of heat conduction may be the y direction and/or the z direction. The thermal conductivities of the first/second heat transfer sections may be measured using a vertical gradient freeze method (JIS H7903, ASTM D5470-1), a disk heat flow meter method (ASTM E1530), a hot wire method (JIS R2616, ASTM D5930), a laser flash method, and the like.

The first heat transfer section 81 is formed of, for example, graphite. Since the first heat transfer section 81 is formed of graphite, high thermal conductivity can be given to the first heat transfer section 81. The second heat transfer section 82 is formed of, for example, metal such as copper or aluminum. Since the second heat transfer section 82 is formed of metal, a high heat capacity can be given to the second heat transfer section 82.

The first heat transfer section 81 and the second heat transfer section 82 have heat capacities per unit length in the y direction different from each other. The heat capacity per unit length in the y direction of the second heat transfer section 82 is larger than the heat capacity per unit length in the y direction of the first heat transfer section 81.

The volume per unit length in the y direction of the second heat transfer section 82 is larger than the volume per unit length in the y direction of the first heat transfer section 81. The second heat transfer section 82 is formed thicker than the first heat transfer section 81.

The heat capacity of the first/second heat transfer sections may be measured using a laser flash method (JIS R1611), an adiabatic method, a DSC method (JIS K7123, JIS R1672), a drop calorimeter method, and the like.

In this embodiment, if the first heat transfer section 81 has relatively high thermal conductivity, then heat transferred from the tubular body 36 to the heat conduction section 80 can be dispersed in the y direction and temperature unevenness (nonuniformity of temperature) in the y direction of the tubular body 36 can be suppressed. If the temperature unevenness in the y direction of the tubular body 36 can be suppressed, then unevenness of gloss (for example, gloss streaks) in an image formed on a sheet is suppressed.

In this embodiment, if the second heat transfer section 82 has the lower thermal conductivity and the higher heat capacity compared to the first heat transfer section 81, then a temperature rise in the second heat transfer section 82 can be suppressed. In this embodiment, a deficiency caused by the temperature rise in the second heat transfer section 82 can be suppressed. For example, even if the supporting member 37 is made of resin, breakage of the supporting member 37 due to the temperature rise can be suppressed.

Second Embodiment

Figure 6:
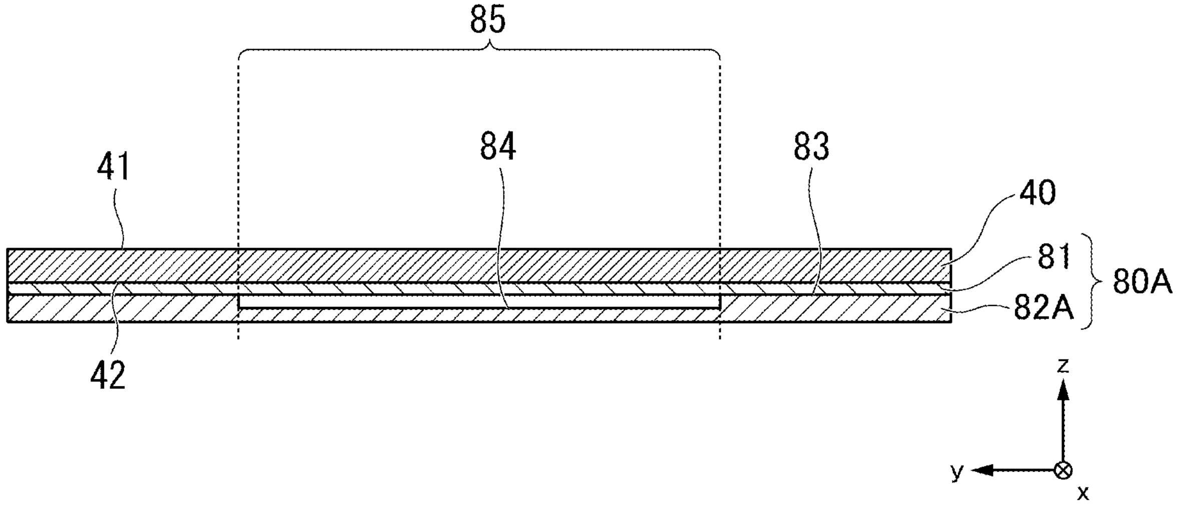
FIG. 6 is a configuration diagram of a heater unit and a heat conduction section in a film unit in a second embodiment.
Figure 7:
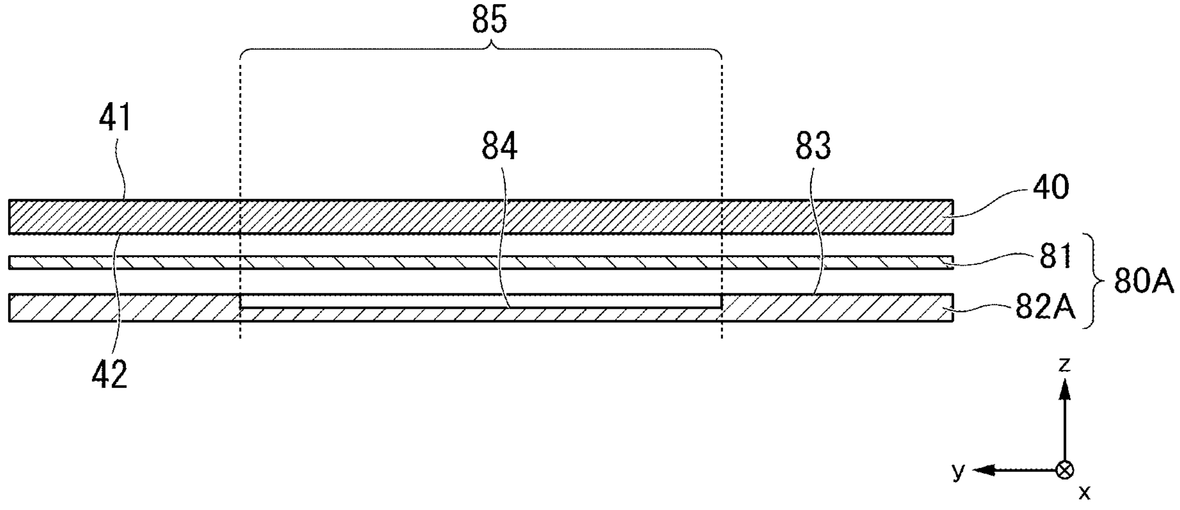
FIG. 7 is an exploded view of the heater unit and the heat conduction section in a film unit, according to some embodiments.

FIG. 6 is a configuration diagram of the heater unit 40 and a heat conduction section 80A in a film unit according to a second embodiment. FIG. 7 is an exploded view of the heater unit 40 and the heat conduction section 80A.

As illustrated in FIGS. 6 and 7, the heat conduction section 80A includes the first heat transfer section 81 and a second heat transfer section 82A.

A recess 84 is formed on a surface 83 of the second heat transfer section 82A opposed to the first heat transfer section 81. The recess 84 is formed in a paper passing region 85 of the surface 83. The paper passing region 85 is a region in a predetermined range in the y direction and is a region where a sheet passes. For example, the paper passing region 85 is a region including the center in the y direction of the surface 83. The recess 84 is formed over the entire range in the y direction of the paper passing region 85. For example, the recess 84 has fixed width in the y direction. In other embodiments, the recess 84 is formed over a portion of the paper passing region 85 in the y direction.

The recess 84 may be formed by one or a plurality of grooves extending along the y direction. If the recess 84 is formed by the one or the plurality of grooves extending along the y direction, then a decrease in the rigidity of the second heat transfer section 82A can be suppressed. That is, the second heat transfer section 82A may be rigid. The recess 84 may be a hole piercing through the second heat transfer section 82A from the surface 83 to the surface opposite to the surface 83 of the second heat transfer section 82A.

It is preferable that a recess be formed over the entire range in the y direction of a paper passing region. However, the recess may be formed in only a part of a range in the y direction of the paper passing region.

The heat capacity per unit length in the y direction of the second heat transfer section 82A in a range in which the recess 84 is formed is smaller compared to the heat capacity per unit length in the y direction of the second heat transfer section 82A in a range in which the recess 84 is not formed. The second heat transfer section 82A in the range in which the recess 84 is formed may be thinner than the second heat transfer section 82A in the range in which the recess 84 is not formed (e.g., the recess 84 may not be present). The volume per unit length in the y direction of the second heat transfer section 82A in the range in which the recess 84 is formed is smaller than the volume per unit length in the y direction of the second heat transfer section 82A in the range in which the recess 84 is not formed. The contact area of the second heat transfer section 82A with the first heat transfer section 81 in the range in which the recess 84 is formed is smaller than the contact area of the second heat transfer section 82A with the first heat transfer section 81 in the range in which the recess 84 is not formed.

In this embodiment, in the paper passing region 85 where the recess 84 is formed, the heat capacity of the heat conduction section 80A per unit length in the y direction is smaller compared to the heat capacity of the heat conduction section 80A in the range in which the recess 84 is not formed. Since the heat conduction section 80A takes more heat from the heater unit 40 in the paper passing region 85, it may be easier to heat the tubular body 36 in the paper passing region 85. Accordingly, the heater unit 40 can sufficiently heat the tubular body 36 in the paper passing region 85, suppressing temperature unevenness in the y direction of the tubular body 36.

Third Embodiment

Figure 8:
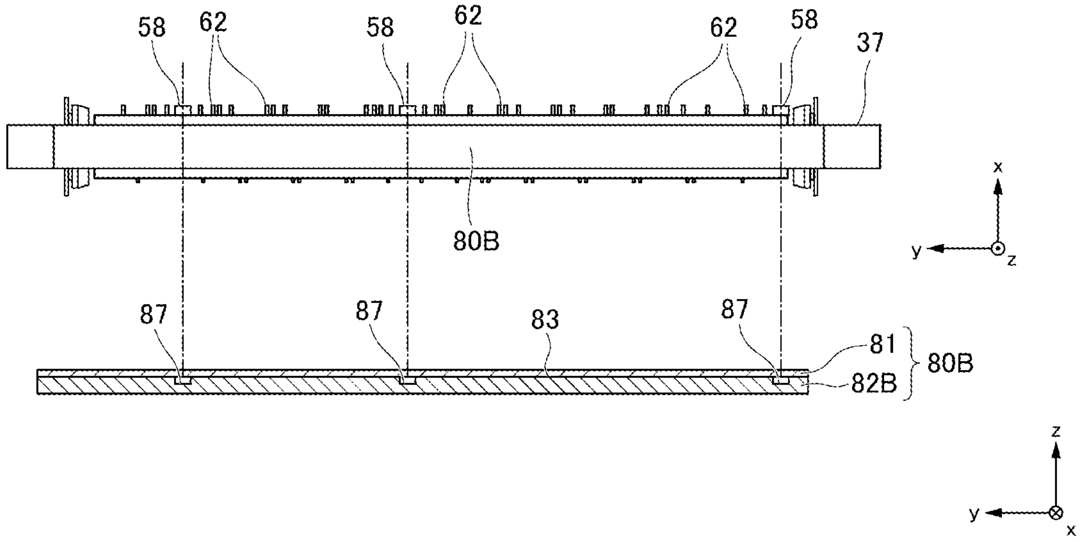
FIG. 8 is a configuration diagram of a film unit in a third embodiment.

FIG. 8 is a configuration diagram of a film unit according to a third embodiment. FIG. 8 illustrates the supporting member 37, the temperature detecting sections 58, and a heat conduction section 80B of the film unit according to the third embodiment.

As illustrated in FIG. 8, the heat conduction section 80B includes the first heat transfer section 81 and a second heat transfer section 82B.

A plurality of recesses 87 are formed on the surface 83 of the second heat transfer section 82B opposed to the first heat transfer section 81. The position in the y direction of at least a part of the recess 87 coincides with the position in the y direction of the temperature detecting section 58.

The recess 87 may be a hole piercing through the second heat transfer section 82B from the surface 83 to the surface opposite to the surface 83 of the second heat transfer section 82B.

The heat capacity per unit length in the y direction of the second heat transfer section 82B in a range in which the recess 87 is formed is smaller compared to the heat capacity per unit length in the y direction of the second heat transfer section 82B in a range in which the recess 87 is not formed (e.g., the recess 87 is not present).

In this embodiment, in a region where the recess 87 is formed, the heat capacity of the heat conduction section 80B per unit length in the y direction is smaller compared to the heat capacity of the heat conduction section 80B in the range in which the recess 87 is not formed. Since the heat conduction section 80B takes more heat from the heater unit 40 in a range in the y direction in which the temperature detecting section 58 is formed, it may be easier to heat the tubular body 36 in the range. Accordingly, the heater unit 40 can sufficiently heat the tubular body 36 in the range of the temperature detecting section 58, suppressing temperature unevenness in the y direction of the tubular body 36.

Fourth Embodiment

Figure 9:
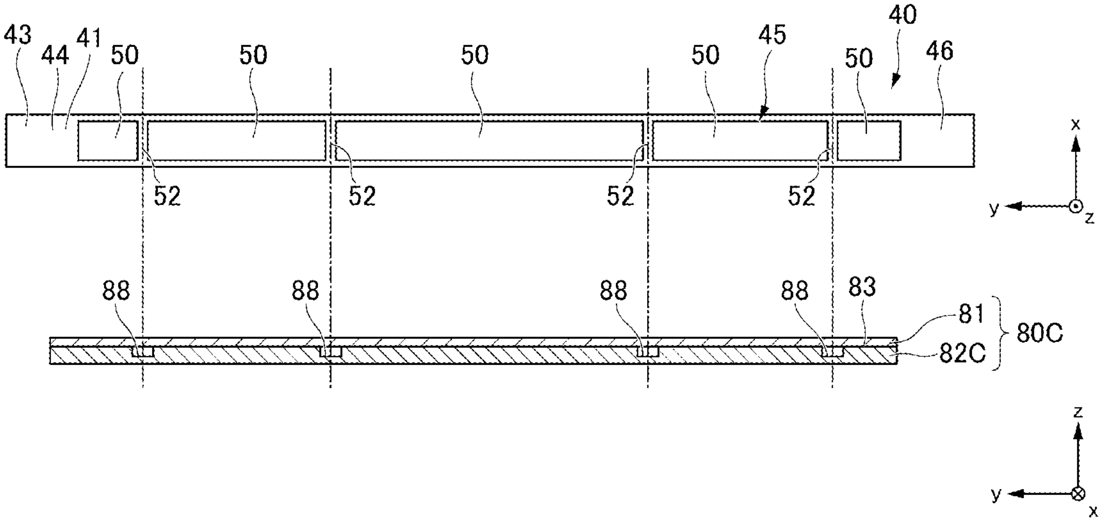
FIG. 9 is a configuration diagram of a film unit in a fourth embodiment.
Figure 10:
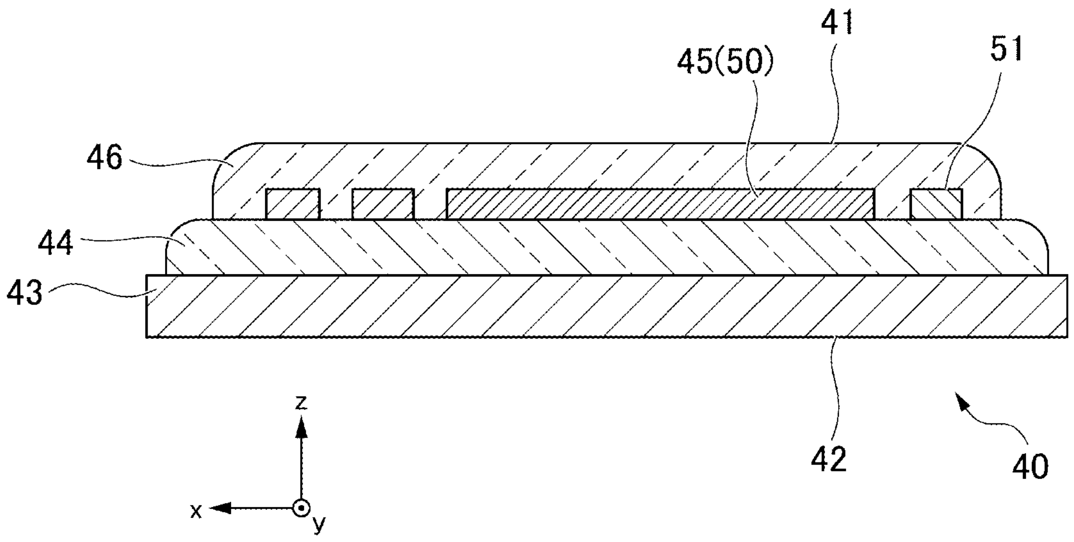
FIG. 10 is a sectional view of a heater unit according to some embodiments.

FIG. 9 is a configuration diagram of a film unit according to a fourth embodiment. FIG. 9 illustrates the heater unit 40 and a heat conduction section 80C of the film unit according to the fourth embodiment. FIG. 10 is a sectional view of the heater unit 40.

As illustrated in FIGS. 9 and 10, the heater unit 40 includes a substrate 43 and a heat generating section 45.

The substrate 43 is formed of a metal material (stainless steel or the like), a ceramic material (aluminum nitride or the like), or the like. The substrate 43 has a rectangular plate shape having the y direction as a longitudinal direction and having the x direction as a latitudinal direction. An insulating layer 44 is formed of a glass material or the like on the surface in the +z direction of the substrate 43 (see FIG. 10). The surface in the +z direction of the substrate 43 is a surface opposed to the inner surface of the tubular body 36.

The heat generating section 45 and a wire 51 (see FIG. 10) are formed on the surface in the +z direction of the insulating layer 44. The heat generating section 45 includes a plurality of heat generating bodies (heat generating bodies) 50. For example, the heat generating body 50 is formed by screen-printing a material such as a silver-palladium alloy. The heat generating body 50 has a rectangular shape, a pair of sides of which extends along the y direction and another pair of sides of which extends along the x direction. The plurality of heat generating bodies 50 are arranged at intervals in the y direction. A gap 52 between the heat generating bodies 50 adjacent to each other is formed in a linear shape extending along the x direction. The heat generating section 45 is formed on the surface in the +z direction of the substrate 43 via the insulating layer 44.

The heat generating section 45 generates heat by being energized through the wire 51 (see FIG. 10). The sheet S having small width in the y direction passes the center in the y direction of the fixing device 30. In this case, the control section 6 causes only a part located on the inner side among the plurality of heat generating bodies 50 to generate heat. In the case of the sheet S having large width in the y direction, the control section 6 causes one or multiple heat generating bodies 50 to generate heat.

As illustrated in FIG. 10, a protection layer 46 is formed of a glass material or the like on the surface in the +z direction of the heater unit 40 to cover the heat generating section 45 and the wire 51. The protection layer 46 forms the first surface 41 of the heater unit 40.

Like the insulating layer 44 formed in the +z direction of the substrate 43, an insulating layer may be formed in the −z direction of the substrate 43. Like the protection layer 46 formed in the +z direction of the substrate 43, a protection layer may be formed in the −z direction of the substrate 43.

As illustrated in FIG. 9, the heat conduction section 80C includes the first heat transfer section 81 and a second heat transfer section 82C.

A plurality of recesses 88 are formed on the surface 83 of the second heat transfer section 82C opposed to the first heat transfer section 81. The position in the y direction of at least a part of the recess 88 coincides with the position in the y direction of the gap 52 between the heat generating bodies 50 adjacent to each other.

The recess 88 may be a hole piercing through the second heat transfer section 82C from the surface 83 to the surface opposite to the surface 83 of the second heat transfer section 82C.

The heat capacity per unit length in the y direction of the second heat transfer section 82C in a range in which the recess 88 is formed is smaller compared to the heat capacity per unit length in the y direction of the second heat transfer section 82C in a range in which the recess 88 is not formed (e.g., the recess 88 is not present).

In this embodiment, in a region where the recess 88 is formed, the heat capacity of the heat conduction section 80C per unit length in the y direction is smaller compared to the heat capacity of the heat conduction section 80C in the range in which the recess 88 is not formed. Since the heat conduction section 80C takes more heat from the heater unit 40 in a range in the y direction in which the gap 52 is formed, it may be easier to heat the tubular body 36 in the range. Accordingly, the heater unit 40 can sufficiently heat the tubular body 36 in the range of the gap 52, suppressing temperature unevenness in the y direction of the tubular body 36.

In an example illustrated in FIG. 9, since the heat generating body 50 has the rectangular shape, the gap 52 between the heat generating bodies 50 adjacent to each other is formed in a linear shape extending along the x direction. The shape of a heat generating body viewed from the z direction may not be the rectangular shape. For example, the sides at both the ends in the y direction of the heat generating body may be inclined with respect to the x direction. In that case, a gap between heat generating bodies adjacent to each other is sometimes formed to be inclined with respect to the x direction. Even if the gap between the heat generating bodies is inclined with respect to the x direction, the position in the y direction in at least a part of a recess may coincide with the position in the y direction of the gap between the heat generating bodies adjacent to each other.

Fifth Embodiment

Figure 11:
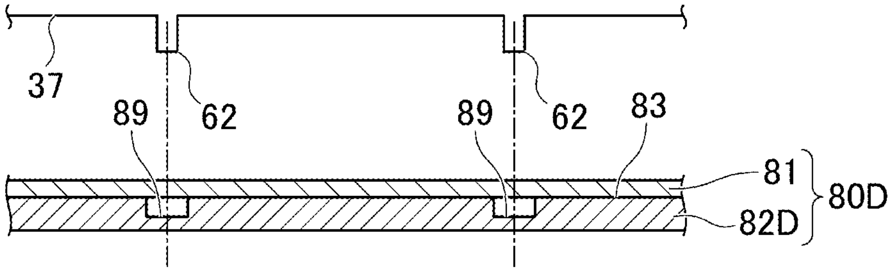
FIG. 11 is a configuration diagram of a film unit in a fifth embodiment.

FIG. 11 is a configuration diagram of a film unit according to a fifth embodiment. FIG. 11 illustrates the supporting member 37 and a heat conduction section 80D according to the fifth embodiment.

As illustrated in FIG. 11, the heat conduction section 80D includes the first heat transfer section 81 and a second heat transfer section 82D.

A plurality of recesses 89 are formed on the surface 83 of the second heat transfer section 82D opposed to the first heat transfer section 81. The position in the y direction of at least a part of the recess 89 coincides with the position in the y direction of the sliding contact rib 62 of the supporting member 37.

The recess 89 may be a hole piercing through the second heat transfer section 82D from the surface 83 to the surface opposite to the surface 83 of the second heat transfer section 82D.

In this embodiment, the heater unit 40 may more easily heat the tubular body 36 in the range in the y direction in which the sliding contact rib 62 is formed. Accordingly, the heater unit 40 can sufficiently heat the tubular body 36 in the range of the sliding contact rib 62, suppressing temperature unevenness in the y direction of the tubular body 36.

Sixth Embodiment

Figure 12:
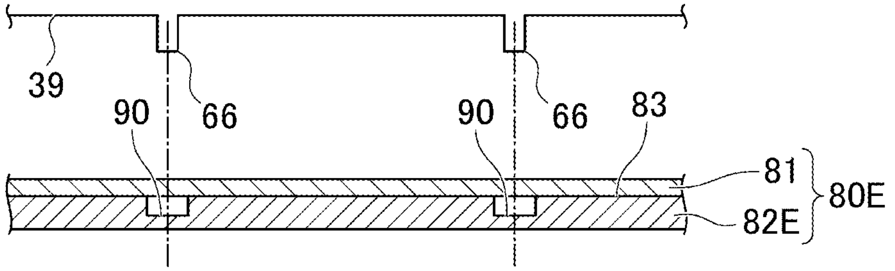
FIG. 12 is a configuration diagram of a film unit in a sixth embodiment.

FIG. 12 is a configuration diagram of a film unit according to a sixth embodiment. FIG. 12 illustrates the guide member 39 and a heat conduction section 80E of the film unit according to the sixth embodiment.

As illustrated in FIG. 12, the heat conduction section 80E includes the first heat transfer section 81 and a second heat transfer section 82E.

A plurality of recesses 90 are formed on the surface 83 of the second heat transfer section 82E opposed to the first heat transfer section 81. The position in the y direction of at least a part of the recess 90 coincides with the position in the y direction of the guide rib 66 of the guide member 39.

The recess 90 may be a hole piercing through the second heat transfer section 82E from the surface 83 to the surface opposite to the surface 83 of the second heat transfer section 82E.

In this embodiment, the heater unit 40 may more easily heat the tubular body 36 in the range in the y direction in which the guide rib 66 is formed. Accordingly, the heater unit 40 can sufficiently heat the tubular body 36 in the range of the guide rib 66, suppressing temperature unevenness in the y direction of the tubular body 36.

Generally, if the thermal conductivity of the first heat transfer section satisfies a threshold (e.g., is relatively high), heat transferred from the tubular body to the heat conduction section can be dispersed in the second direction and temperature unevenness (nonuniformity of temperature) in the second direction of the tubular body can be suppressed. Suppressing the temperature unevenness in the second direction of the tubular body results in suppressing unevenness of gloss (for example, gloss streaks) in an image formed on a sheet. Since the second heat transfer section has lower thermal conductivity and a higher heat capacity compared to the first heat transfer section, a temperature rise in the second heat transfer section can be suppressed and a deficiency due to the temperature rise can be suppressed.

While certain embodiments have been described, these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A device configured to fix toner to a sheet, the device comprising:

a tubular body configured to be in contact with the sheet moving in a first direction;

a heater comprising a heat generator, a first surface, and a second surface on an opposite side of the first surface; and a heat conduction section in contact with the second surface of the heater and configured to transfer heat generated from the heat generator, the heat conduction section comprising:

a first heat transfer section; and a second heat transfer section in contact with the first heat transfer section, the second heat transfer section defining a recess on a surface of the second heat transfer section that is opposed to the first heat transfer section in a region where the sheet passes.

2. The device according to claim 1, wherein the second heat transfer section has a lower thermal conductivity and a larger heat capacity per unit length compared to the first heat transfer section.

3. The device according to claim 1, wherein the first surface of the heater is in contact with the tubular body.

4. The device according to claim 1, wherein the tubular body has a length extending along a second direction that is orthogonal to the first direction;

the heat generator comprises a plurality of heat generator devices arranged at one or more intervals in the second direction; and a part of the recess is at a position in the second direction that coincides with a position of a gap between the heat generator devices in the second direction.

5. The device according to claim 1, further comprising:

a supporting member supporting the heater, wherein the tubular body has a length extending along a second direction that is orthogonal to the first direction;

the supporting member comprises one or more sliding contact ribs that are arranged at one or more intervals in the second direction and are in sliding contact with the tubular body; and at least a part of the recess coincides with a position of a gap between the one or more sliding contact ribs in the second direction.

6. The device according to claim 1, wherein the tubular body has a length extending along a second direction that is orthogonal to the first direction, and the recess is one or a plurality of grooves extending along the second direction.

7. The device according to claim 1, wherein the first heat transfer section is formed of graphite, and the second heat transfer section is formed of metal.

8. The device according to claim 1, further comprising a supporting member supporting the heater, wherein the supporting member is formed of a resin material, and the second heat transfer section is in contact with the supporting member.

9. The device according to claim 1, wherein the heater comprises a substrate, and the heat generator is positioned on a surface of the substrate opposed to the tubular body.

10. The device according to claim 9, wherein the substrate is formed of ceramic.

11. A device configured to fix toner to a sheet, the device comprising:

a tubular body configured to be in contact with the sheet moving in a first direction, the tubular body having a length extending in a second direction;

a temperature detector in contact with the tubular body and configured to detect a temperature of the tubular body;

a heater comprising a heat generator, a first surface, and a second surface on an opposite side of the first surface; and a heat conduction section in contact with the second surface of the heater and configured to transfer heat generated from the heat generator, the heat conduction section comprising:

a first heat transfer section; and a second heat transfer section in contact with the first heat transfer section, the second heat transfer section defining a recess on a surface of the second heat transfer section opposed to the first heat transfer section, wherein a part of the recess is at a position in the second direction that coincides with a position of the temperature detector in the second direction.

12. The device according to claim 11, wherein the second heat transfer section has a lower thermal conductivity and a larger heat capacity per unit length compared to the first heat transfer section.

13. The device according to claim 11, wherein the first surface of the heater is in contact with the tubular body.

14. A method for fixing toner to a sheet, the method comprising:

rotating a tubular body in contact with the sheet, the tubular body having a length extending in a length direction;

transferring heat using a heater and a heat conduction section, the heater comprising a heat generator, a first surface, and a second surface on an opposite side of the first surface, the heat conduction section being in contact with the second surface of the heater, the heat conduction section comprising:

a first heat transfer section; and a second heat transfer section in contact with the first heat transfer section, the second heat transfer section defining a recess on a surface of the second heat transfer section that is opposed to the first heat transfer section in a region where the sheet passes.

15. The method according to claim 14, wherein the second heat transfer section has a lower thermal conductivity and a larger heat capacity per unit length in the length direction compared to the first heat transfer section.

16. The method according to claim 14, wherein the first surface of the heater is in contact with the tubular body.

17. The method according to claim 14, further comprising detecting temperature of the tubular body via a temperature detector in contact with the tubular body, wherein a part of the recess is at a position in the length direction and coincides with a position of the temperature detector in the length direction.

18. The method according to claim 14, wherein the heat generator comprises a plurality of heat generator devices arranged at one or more intervals in the length direction, wherein a part of the recess is at a position in the length direction that coincides with a position of a gap between the heat generator devices in the length direction.

19. The method according to claim 14, wherein the heater is supported by a supporting member, the supporting member comprising one or more sliding contact ribs that are arranged at intervals in the length direction and are in sliding contact with the tubular body, and wherein at least a part of the recess coincides with a position of a gap between the one or more sliding contact ribs in the length direction.

20. The method according to claim 14, wherein the first heat transfer section is formed of graphite, and the second heat transfer section is formed of metal.

* * * * *